Patent

2,832,795

SURFACE-ACTIVE AGENTS

Herbert Hempel, Leverkusen, Mathieu Quaedvlieg, Leverkusen-Bayerwerk, and Karl Hintzmann and Rudolf Dahmen, Leverkusen, Germany, assignors to Farbenfabriken Bayer Aktiengesellschaft, Leverkusen, Germany, a corporation of Germany No Drawing. Application April 3, 1956
Serial No. 575,714

Claims priority, application Germany April 9, 1955

6 Claims. (Cl. 260—458)

The present invention relates to surface-active agents; more particularly it concerns surface active polyglycol ethers of aromatic compounds carrying a phenolic hydroxyl group and a hydrocarbon-substituted amino group linked by a methylene bridge, or their sulphonation products or carboxylic acid esters. These compounds are outstandingly effective surface-active agents and are suitable for use particularly as detergents, dispersing agents, emulsifying agents, wetting agents, levelling or stripping agents.

The surface active agents of the present invention correspond to the general formula:

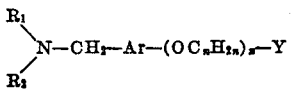

wherein $R_1$ stands for a monovalent radical of an aliphatic, cycloaliphatic, or aromatic hydrocarbon, and $R_2$ stands for hydrogen or a monovalent radical of an aliphatic, cycloaliphatic, or aromatic hydrocarbon which may be the same as or different from $R_1$, whereas Ar stands for the radical of an aromatic hydrocarbon, which may also be substituted, particularly by alkyl groups and Y stands for a free hydroxyl group or a hydroxyl group esterified by a sulfonic or carboxylic acid; $n$ and $x$ are whole numbers and at least 2.

Various possibilities exist for the production of these surface-active polyglycol ethers or of their sulphonation products or carboxylic acid esters; for example, the aromatic compounds carrying a phenolic hydroxyl group may initially be condensed in known manner with formaldehyde and primary or secondary amines and thereupon be treated with alkylene oxides and if desired the polyglycol ethers thus formed suitably be sulphonated or esterified; in many cases the aromatic compounds carrying a phenolic hydroxyl group may also be initially treated with alkylene oxides and subsequently condensed with formaldehyde and primary or secondary amines, as well as being suitably sulphonated or esterified, if desired. As to the components upon which the polyglycol ethers, their sulphonation products or carboxylic acid esters, are based, the following may be given:

Aromatic compounds which carry a phenolic hydroxyl group are, for example, phenol, the various cresols, xylenols, and butyl phenols, particularly the tertiary butyl phenols; as well as phenols which are substituted by fairly long alkyl chains, particularly with alkyl radicals from $C_5H_{11}$ to $C_{12}H_{25}$; furthermore naphthols, especially alkyl naphthols; insofar as phenols which cannot be directly obtained as such are concerned, they may be produced by condensation of phenol with olefines, such as propylene, butylene, octylene, nonylene, dodecylene, in the presence of suitable catalysts, for example in the presence of boron fluoride.

By the term primary or secondary amines there are to be understood aliphatic, cyclo-aliphatic, or aromatic amines, such as methylamine, ethylamine, propylamine, butylamine, isoamylamine, cyclohexylamine, octylamine, decylamine, dodecylamine, tetradecylamine, hexadecylamine, octadecylamine, oleylamine, furthermore aniline and its substitution products such as 2,4-diethylaniline.

As alkylene oxides there may be mentioned in the first instance ethylene oxide, propylene oxide and butylene oxide. The amount of polyglycol groups in the surface-active agents according to the invention may vary within wide limits; the suitable length of the polyglycol chain may be found by preliminary experiment for each case. When using the polyglycol ethers as detergents for washing cotton the compounds having long polyglycol chains are generally the most effective, whereas the compounds having short polyglycol chains are in general to be preferred for washing wool. In addition to the length of the polyglycol chain, the size of the hydrocarbon substituents in the amino components, and, possibly, also in the phenolic components affects the properties of the polyglycol ethers according to the invention. The greatest washing activity is thus shown generally by polyglycol ethers carrying a relatively short-chain hydrocarbon radical in the amino components, and a relatively long-chain hydrocarbon radical in the phenolic components, whereas the best levelling effect is exhibited by polyglycol ethers containing a relatively long-chain hydrocarbon radical in the amino components and a relatively short-chain hydrocarbon radical or no hydrocarbon radical at all in the phenolic components. Similar conditions as have been described for the polyglycol ethers themselves apply also to their sulphonation products obtainable, for example, by treating polyglycol ethers with amidosulphonic acid or chlorosulphonic acid; the same is true for the esters of polyglycol ethers with carboxylic acids, such as acetic acid, maleic acid, or phthalic acid.

The following examples serve to illustrate the present invention without, however, limiting the scope thereof, the parts being parts by weight.

*Example 1*

Wool is washed with a 0.05 percent aqueous solution of a polyglycol ether prepared as hereinafter described. The cleansing effect thus obtained is outstanding. The polyglycol ether was prepared as follows:

To a mixture of 91.5 parts of a 27.3 percent ethylamine and 2 parts of a 50 percent caustic potash solution were added with stirring 65 parts of a 30 percent formaldehyde. The temperature of the mixture which was thereby raised from 20 to 55° C., was increased to 60–65° C. by further heating and maintained while stirring for 3 hours. The reaction mixture was thereupon treated with 110 parts of nonyl phenol, acidified by the addition of 10 parts of concentrated hydrochloric acid and heated to 90–95° C. for 2 hours. After the reaction mixture has been allowed to settle, the aqueous layer was separated out, the remaining oily layer washed with hot water and freed from water by heating under vacuum. The oil thus obtained was thereupon treated with sodium methylate freshly prepared by dissolving 1 part of sodium in anhydrous methanol, and heated to 150° C. After the methanol had been driven off, ethylene oxide was introduced at this temperature into the remaining portion until 240 parts had been taken up. The polyglycol ether thus obtained dissolved to a clear solution in water.

*Example 2*

For washing wool there is used a 0.05 percent aqueous solution of a polyglycol ether prepared as follows:

78.5 parts of butylamine were treated with 10 parts of a 20 percent caustic potash solution and 100 parts of a 30 percent formaldehyde and heated with stirring to 60–70° C. for 2 hours; the reaction mixture was thereupon treated with 50 parts of water, thoroughly stirred through, and allowed to stand for some length of time. The settled aqueous layer was then separated out, the remaining reaction mixture treated with 150 parts of tertiary butyl phenol as well as 30 parts of concentrated hydrochloric acid, and heated with stirring to 90–100° C. for 3 hours. After separation of the aqueous layer, the condensation product was then washed with hot water, and subsequently dried under vacuum. The dry oil was thereupon treated with a sodium methylate solution prepared by dissolving 1 part of sodium in methanol, and heated to 150° C., whereupon the methanol was distilled off. 500 parts of ethylene oxide were thereupon introduced into the remaining portion. The polyglycol ether thus obtained dissolved to a clear solution in water.

Example 3

For washing and degreasing wool in an acid medium, there is used a polyglycol ether prepared as follows:

99 parts of cyclohexylamine, 5 parts of a 20 percent caustic potash solution and 100 parts of a 30 percent formaldehyde are heated with stirring to 70° C. for 3 hours, thereupon reacted with 220 parts of nonyl phenol and heated for a further 5 hours to 90–100° C. The oily reaction product thus formed was dried under vacuum, thereupon reacted with sodium methylate prepared by dissolving 1.5 parts of sodium in methanol, and heated to 140–150° C. In a nitrogen atmosphere at an excess pressure of 1 to 2 atmospheres, 780 parts of liquid ethylene oxide were slowly run into the oily product. With rapid consumption of ethylene oxide a polyglycol ether was obtained which dissolved to a clear solution in water.

Example 4

For washing wool there is used a polyglycol ether, the preparation of which is described as follows:

30 parts of paraformaldehyde were introduced into 99 parts of cyclohexylamine heated to 90° C. After the mixture had been heated for a further 1 hour to 90° C., 262 parts of dodecyl phenol were added, and the mixture again heated for 1 hour to 90° C. The water split off was removed under vacuum and the reaction mixture reacted with sodium methylate prepared by dissolving 2 parts of sodium in methanol. After distilling off of the methanol, ethylene oxide was introduced into the remaining portion at 140 to 150° C. until the increase in weight corresponded to 750 parts.

Example 5

For the washing of wool there is used with good results a polyglycol ether prepared as follows:

65 parts of octylamine were stirred together with 150 parts of water and 5 parts of a 50 percent caustic potash solution, the mixture was heated to 60° C., thereupon reacted with 65 parts of a 30 percent formaldehyde and then heated to 60–70° C. for a further 2 hours. After separation of the lower aqueous layer, the reaction mixture was treated with 82 parts of tertiary butyl phenol and 30 parts of concentrated hydrochloric acid and heated with stirring to 90–95° C. for 2 hours. After renewed separation of the aqueous layer, the remaining oily portions were washed with hot water, dried under vacuum, reacted with a solution of 1 part of sodium in methyl alcohol and after distillation of the methyl alcohol reacted with 240 parts of ethylene oxide at approximately 150° C.

Example 6

An excellent leveling effect in wool dyeing, and a notable washing and degreasing effect is exhibited by the polyglycol ether prepared as follows:

93 parts of dodecylamine were heated with stirring to 80° C. for 3 hours with 150 parts of water and 5 parts of a 40 percent caustic potash solution and 60 parts of formaldehyde. After the separation of the lower layer the reaction mixture was reacted with 55 parts of p-cresol and then with 30 parts of concentrated hydrochloric acid and heated to 90–100° C. for 2 hours. After renewed separation of the aqueous layer, the reaction mixture was washed with hot water, subsequently dried under vacuum, and reacted with a solution of 0.8 part of sodium in methanol. At a temperature of 150–160° C. and after distillation of the methyl alcohol, 220 parts of ethylene oxide were reacted with the product. The polyglycol ether thus formed dissolved to a clear solution in water.

Example 7

A polyglycol ether which may be employed as an excellent levelling and stripping agent for wool dyes and has good washing and degreasing properties is prepared as follows:

135 parts of octadecylamine, 300 parts of water and 5 parts of a 40 percent caustic potash solution were heated to 60° C. and then reacted with 60 parts of a 30 percent formaldehyde. The mixture was heated, with stirring, to 70–80° C. for 2 hours, the aqueous layer was then separated off, the oily layer, after washing with hot water, was reacted with 50 parts of phenol and 10 parts of concentrated hydrochloric acid, and again heated to a temperature of 90–95° C. After renewed separation of the aqueous layer, the remaining portion was dried under vacuum, treated with a solution of 1,2 parts of sodium in methanol, and reacted with 240 parts of ethylene oxide under pressure at 150° C.

Example 8

A polyglycol ether is used as levelling and stripping agent, prepared as follows:

268 parts of oleylamine were stirred together with 500 parts of water and 10 parts of a 40 percent caustic potash solution, then reacted with 120 parts of a 30 percent formaldehyde and heated with stirring to 60 to 70° C. for 2 hours. After separation of the aqueous layer the reaction mixture was thereupon reacted with 150 parts of phenol and 10 parts of concentrated hydrochloric acid, and heated to a temperature of 90–100° C. for 1 hour. The reaction mixture was thereupon washed with hot water until neutral, dried under vacuum, treated with a solution of 2 parts of sodium in methanol, and then reacted with 550 parts of ethylene oxide at 160° C.

Example 9

A polyglycol ether which has proved itself as a levelling agent having detergent and degreasing properties is prepared as follows:

120 parts of cetylamine were reacted at 90° C. with stirring with 15 parts of paraformaldehyde and subsequently maintained at this temperature for another 2 hours. 48 parts of phenol were thereupon added and the reaction mixture was again heated to 90° C. for 2 hours; the water thus formed was subsequently distilled off under vacuum. The remaining portion was treated with a solution of 1 part of sodium in methanol, and reacted with 275 parts of ethylene oxide at 150° C.

Example 10

A polyglycol ether obtained in the following manner possesses an excellent levelling effect for wool dyestuffs.

120 parts of cetylamine, 15 parts of paraformaldehyde and 48 parts of phenol were reacted with each other as indicated in Example 9. 174 parts of the reaction product freed from water under vacuum were then treated with a solution of 1.2 parts of sodium in methanol and brought to reaction with 145 parts of propylene oxide, the reaction product being subsequently reacted with 110 parts of ethylene oxide. The product obtained dissolved to a clear solution in water.

Still better levelling properties are shown by a polyglycol ether prepared from the indicated components in such a manner that the amounts of propylene oxide and ethylene oxide are reacted alternately in five portions each; a polyglycol ether is thus obtained containing approximately in every second glycol group a methyl radical as substituent.

*Example 11*

A polyglycol ether used for washing wool or cotton, is prepared in the following manner.

The oily reaction product obtained according to Example 3 from 99 parts of cyclohexylamine, 100 parts of a 30 percent formaldehyde and 220 parts of nonyl phenol was reacted after drying under vacuum with 88 parts of ethylene oxide in the presence of sodium methylate at 150° C. The polyglycol ether thus obtained which was still completely water-insoluble was then mixed with 65 parts of urea and 65 parts of oleyl polyglycol ether containing about 20 glycol groups in the molecule, heated to 90 to 95° C., reacted at this temperature with 125 parts of amidosulphonic acid, and stirred until a sample of the reaction product dissolved to a clear solution in water. 35 parts of disodium phosphate were added in addition to the sulphonation product as a buffer.

*Example 12*

A polyglycol ether ester has proved itself as an excellent detergent when prepared as follows:

91.5 parts of a 27.3 percent ethylamine and 110 parts of nonyl phenol were condensed with 65 parts of a 30 percent formaldehyde as described in Example 1, and reacted with 220 parts of ethylene oxide. The polyglycol ether thus obtained was then heated with stirring with 49 parts of maleic acid anhydride to 95–100° C. The reaction product, neutralized with 88 parts of triethanolamine, dissolved in water to a clear solution.

We claim:

1. Surface-active agents of the general formula

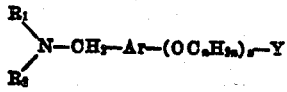

wherein $R_1$ stands for a member of the group consisting of monovalent aliphatic, cycloaliphatic and benzene radicals and $R_2$ stands for a member of the group consisting of hydrogen and monovalent aliphatic, cycloaliphatic and benzene radicals whereas Ar represents a member of the group consisting of benzene radicals, naphthalene radicals, alkyl substituted benzene radicals and alkyl substituted naphthalene radicals and Y indicates a member of the group consisting of a hydroxyl group, a hydroxyl group esterified by a sulfonic acid and a hydroxyl group esterified by a carboxylic acid, while $n$ is an integer from 2 to 4, both inclusive and $x$ is an integer from 2 to 75, both inclusive.

2. Surface-active agents of the general formula of claim 1 wherein $R_1$ stands for the ethyl group and $R_2$ for hydrogen whereas Ar represents a phenyl radical substituted by a nonyl group and Y indicates a hydroxyl group.

3. Surface-active agents of the general formula of claim 1 wherein $R_1$ stands for an octyl group and $R_2$ for hydrogen whereas Ar represents a phenyl radical substituted by a tertiary butyl group and Y indicates a hydroxyl group.

4. Surface-active agents of the general formula of claim 1 wherein $R_1$ stands for the oleyl group and $R_2$ for hydrogen whereas Ar represents a phenyl radical and Y indicates a hydroxyl group.

5. Surface-active agents of the general formula of claim 1 wherein $R_1$ stands for the cyclohexyl group and $R_2$ for hydrogen whereas Ar represents a phenyl radical substituted by a nonyl group and Y indicates a hydroxyl group esterified by a sulfonic acid group.

6. Surface-active agents of the general formula of claim 1 wherein $R_1$ stands for the ethyl group and $R_2$ for hydrogen whereas Ar represents a phenyl radical substituted by a nonyl group and Y indicates a hydroxyl group esterified by a carboxylic acid group.

References Cited in the file of this patent

UNITED STATES PATENTS 2,496,582     Enyeart                Feb. 7, 1950

FOREIGN PATENTS 595,962     Great Britain            Dec. 23, 1947